March 21, 1961  R. L. HAMMETT  2,976,357
TELEVISION SLIDE PROJECTOR

Filed Jan. 22, 1957  3 Sheets-Sheet 2

INVENTOR.
ROBERT L. HAMMETT
BY
Lippincott & Smith
ATTORNEYS

United States Patent Office 2,976,357
Patented Mar. 21, 1961

2,976,357

TELEVISION SLIDE PROJECTOR

Robert L. Hammett, 1408 Alvarado Ave., Burlingame, Calif.

Filed Jan. 22, 1957, Ser. No. 635,490

14 Claims. (Cl. 178—7.2)

This invention relates to improved apparatus for televising images from photographic transparencies and the like. The invention may be used in either monochrome or color television.

In television broadcasting it is often necessary to televise visual material that has previously been recorded upon photographic film. Dramatic presentations, for example, may be recorded on motion picture film, while station-identification announcements, certain commercials, and other material may be recorded in still photographs, or the like, usually conventional 2″ x 2″ photographic transparencies. To televise the photographic material, the images recorded on the film must be projected onto a photosensitive surface in the television camera. Two television cameras are sometimes employed to make possible a smooth and uninterrupted change from one subject to another. In the ideal case each television camera would have instantaneous access to a considerable number of still photographs or slides, and to at least two motion picture films. The principal object of this invention is to provide an improved television slide projector system that satisfies the aforesaid requirements.

Briefly stated, in accordance with certain aspects of this invention, means are provided for supporting a plurality of partly transparent or translucent photographic slides or the like in a coplanar array consisting of a plurality of rows each containing a plurality of transparent slide-mounting positions. In a preferred embodiment, a slide magazine includes ten independently removable coplanar mounting strips each forming one row of a coplanar array and each having ten linearly alined spaces for holding ten 2″ x 2″ partly transparent photographic slides. Thus, the entire array contains 100 slide-mounting positions. Two of these positions are reserved for motion-picture projection, as hereinafter explained, and the remaining 98 spaces can accommodate 98 still-picture transparencies or slides. Since the ten mounting strips are separately removable, it is easy to replace some of the slides at any time without interrupting operation of the projector.

In one embodiment, both sides of the array of slides are illuminated, preferably simultaneously. Two television cameras are arranged on opposite sides of the array of slides, and each camera is focused on the area occupied by one slide. Each of the cameras is movable independently of the other, and each can be moved into optical alinement with any one of the 100 different slide-mounting positions in the array. Thus each camera has quick access to any selected one of the 98 still pictures that the array accommodates, as well as to either of two motion pictures. Since one camera views the slides from the normal viewing side while the other views the slides from the reverse side, one of the cameras is operated with a normal scanning pattern while the other is operated with a reversed scanning pattern, so that both cameras transmit correctly oriented pictures.

The two spaces that are reserved for motion picture use contain lenses rather than slides, and means are provided for projecting motion picture images into these two spaces from both sides thereof simultaneously. Consequently, either camera can receive the projected motion pictures whenever it is moved into alinement with one of the motion picture spaces of the slide array.

In an alternative arrangement, flying-spot scanners are substituted for the cameras and photoelectric transducers are substituted for the light sources. As used in this application, the term "photoelectric transducer" refers to any device useful for converting modulated light signals into modulated electric signals, irrespective of whether the operation of such device depends upon photoelectric, photoconductive, photoemissive or other effects.

In another embodiment, only one side of the array of slides is illuminated and both cameras are located on the other side of the array. On the camera side of the array there is a semi-reflecting mirror (or prism) disposed at an angle to the plane of the array. Light transmitted through the slide array and the semi-reflecting mirror reaches a camera that is movable in a plane substantially parallel to the array of slides, while light reflected by the semi-reflecting mirror reaches a camera that is movable in a plane substantially perpendicular to and to one side of the array. The two motion picture projectors are disposed on the opposite side of the semi-reflecting mirror from the array and the last-mentioned camera.

The foregoing and other aspects of this invention will be better understood from the following detailed description of illustrative embodiments taken in connection with the accompanying drawings. The scope of the invention is pointed out in the appended claims.

Figure 1:
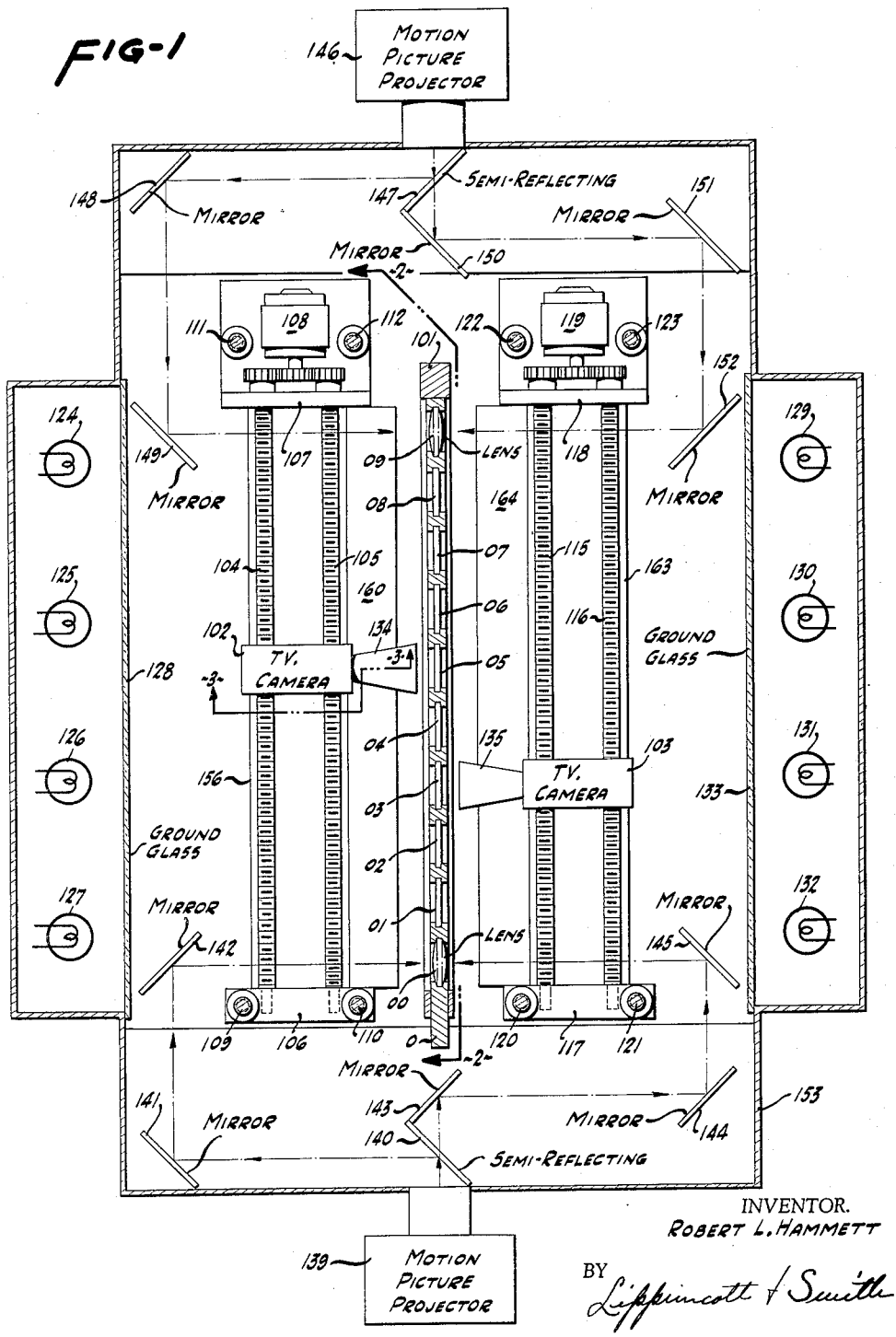
Fig. 1 is a somewhat schematic horizontal section of apparatus embodying principles of this invention.
Figure 2:
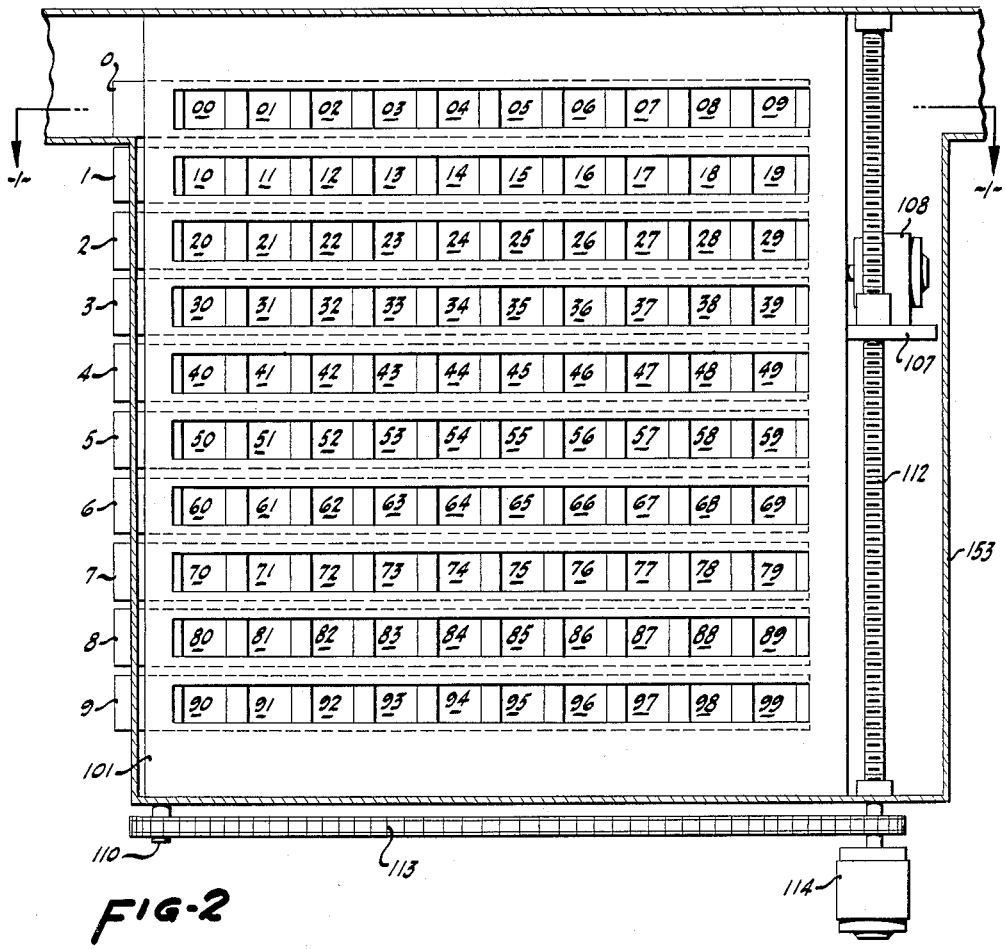
Fig. 2 is a vertical section taken along the line 2—2 of Fig. 1.

Referring now to Figs. 1 and 2 of the drawings, a slide magazine includes ten independently removable mounting strips identified in the drawings by reference numerals 0 through 9. Each of the mounting strips has spaces for receiving and supporting in coplanar linear alinement ten conventional 2″ x 2″ partly transparent or translucent photographic slides or the like, commonly called transparencies. Thus, there are provided 100 slide-mounting positions, which are identified in the drawings by reference numbers 00 through 99, wherein the first digit identifies the mounting strip or row while the second digit identifies the slide position or column within each row.

The ten mounting strips are held in a coplanar array by a supporting member 101, so that the 100 slide-mounting positions form a 10-square coplanar matrix. Slide-mounting positions 00 and 09 are reserved for motion picture projection, as hereinafter explained. Each of the remaining 98 slide-mounting positions is adapted to hold a conventional 2″ x 2″ still-picture transparency. Two small television cameras 102 and 103 are disposed on opposite sides of the slide magazine, as shown in Fig. 1. The two cameras may be either monochrome or color television cameras. Each camera is focused on an area corresponding to one slide in the coplanar array of slides held in the magazine. Furthermore, each camera is independently movable into optical alinement with any selected one of the 100 slide-mounting positions.

For adjusting the horizontal position of camera 102, the camera is mounted on a pair of lead screws 104 and 105 that extend horizontally between a pair of brackets 106 and 107. Lead screws 104 and 105 are connected through gears or other appropriate means to a small electric motor 108 that is mounted upon bracket 107 and is operable to rotate both of the lead screws 104 and 105 simultaneously for moving camera 102 into optical alinement with each of the 10 columns of slide positions, selectively. Alternatively, the lead screws may be non-rotative and the camera may be moved along the lead screws by a nut rotated by a motor mounted on the camera or on supports that move with the camera.

Bracket 106 is mounted upon a pair of vertical lead screws 109 and 110, and bracket 107 is mounted upon a pair of vertical lead screws 111 and 112. The four vertical lead screws 109, 110, 111 and 112 are connected together for simultaneous rotation by suitable means such as sprocket-and-chain mechanism 113. An electric motor 114 is operable to rotate these four vertical lead screws simultaneously for moving camera 102 into optical alinement with each of the ten rows of slide positions, selectively. By operation of motors 108 and 114, camera 102 can be brought into optical alinement with any selected one of the 100 slide-mounting positions 00 through 99.

A similar arrangement is provided for moving camera 103 into optical alinement with each of the 100 slide-mounting positions, selectively. Camera 103 is mounted upon two horizontal lead screws 115 and 116 that extend between two brackets 117 and 118. An electric motor 119 is operable to rotate screws 115 and 116 simultaneously for moving camera 103 into alinement with each of the ten columns of slide positions, selectively. Bracket 117 is mounted upon a pair of vertical lead screws 120 and 121, and bracket 118 is mounted upon a pair of vertical lead screws 122 and 123. Still another electric motor (not shown) is operable to rotate lead screws 120, 121, 122 and 123 simultaneously for moving camera 103 into optical alinement with each of the ten rows of slide positions selectively.

Substantially the entire area of the array of slides is illuminated from both sides simultaneously, so that camera 102 receives light passing through the partly transparent photographic slide with which it is alined, while camera 103 simultaneously receives light passing through the transparent photographic slide with which it is alined. In the illustrated embodiment, one side of the array of slides is illuminated by a bank of lamps 124, 125, 126 and 127 disposed behind a ground glass diffusing screen 128. The other side of the array of slides is illuminated by a bank of lamps 129, 130, 131 and 132 disposed behind a ground glass diffusing screen 133. Both banks of lamps may be turned on and both sides of the array of slides may be illuminated simultaneously while still pictures are being televised.

Each of the two banks of lamps may comprise a planar array of incandescent lamps, or fluorescent lamps, or any other light sources suitable for supplying the required illumination.

For reducing the amount of stray light that might otherwise pass through the camera lenses, and for preventing undesirable reflections from the camera side of the slide being televised, each camera is provided with a hood that shades the camera side of each slide that is in alinement with one of the two cameras. Thus the bank of lamps 124 through 127 illuminates one side of the still-picture slides except the slide with which camera 102 is alined. Similarly, the bank of lamps 129 through 132 illuminates the other side of the still-picture slides except the slide with which camera 103 is alined. The hood attached to camera 102 is identified in the drawings by reference number 134, and the hood attached to camera 103 is identified by reference number 135. The inner ends of hoods 134 and 135 are closely adjacent to opposite sides of the array of slides, and each has an aperture approximately equal to the area of one transparent slide. The outer ends of hoods 134 and 135 fit around the lenses of cameras 102 and 103, respectively.

Since one of the two cameras "sees" the normal viewing or front sides of the slides, while the other camera "sees" the reverse sides of the slides, the horizontal scanning direction must be reversed in one of the cameras so that both cameras will transmit correctly oriented television pictures. For example, camera 102 may be operated with regular scanning, whereas camera 103 is operated with reversed horizontal scanning. A reversal of the camera scanning direction is easily accomplished electronically by means that will be obvious to those skilled in the art.

During the televising of still pictures, one of the cameras is alined with any selected slide in the array, while the other camera is alined with any other selected slide in the array. Either camera may be connected to the television transmitting apparatus, selectively, and switching from one camera to the other without interruption of the television broadcast is easily accomplished by conventional means well known to those skilled in the television art. While a picture is being televised by one camera, the other camera can be moved from one position to another, relative to the slide array. By connecting the two cameras alternately to the television transmitter, and by moving one camera while the other is televising a selected picture, all of the 98 slides can be televised sequentially in any order without interruption. Furthermore, since each of the ten mounting strips 0 through 9 is separately removable, the ten slides in any row of the magazine can be replaced while slides in any of the other 9 rows are being televised, and in practice an unlimited number of slides can be televised sequentially without interruption.

During the movement of one camera while a picture is being televised by the other camera, the two cameras may sometimes momentarily be alined with the same slide. This presents a difficulty in that the moving camera would momentarily tend to block the illumination of the slide being televised, which would cause an undesirable interruption in the televised picture. This difficulty can be overcome in several different ways. One way is to provide an interlock in the positioning system for preventing the two cameras ever coming into alinement with the same slide. Another and preferred solution of the problem is illustrated in Fig. 3.

Figure 3:
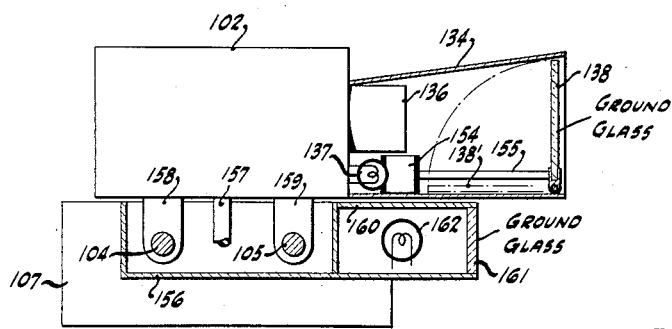
Fig. 3 is a fragmentary vertical section, drawn to a larger scale, taken along the line 3—3 of Fig. 1.

Referring now to Fig. 3 of the drawings, hood 134 fits over the lens 136 of camera 102. The size of the hood at its end nearest the slides is equal to the largest cross-section of the camera. Therefore the hood "hides" the camera. The hood is made sufficiently large to accommodate a lamp 137 alongside and out of optical alinement with lens 136. While camera 102 is televising a slide, lamp 137 is turned off and has no effect upon the operation of the slide projector. However, whenever motor 108 or motor 114, or both, is in operation for moving camera 102 from one position to another relative to the array of slides, lamp 137 is turned on and illuminates the camera side of any slide that is momentarily in alinement with camera 102. A ground glass diffusing screen 138 spreads the light from lamp 137 evenly over the aperture at the front end of mask 134. The brightness of lamp 137 is adjusted so that the illumination of the slide provided by lamp 137 is substantially equal to the illumination that the slide would receive from the bank of lamps 124 through 127 if the camera and mask were not in the way.

While camera 102 is in motion and lamp 137 is lit, screen 138 is raised into the position shown by a solenoid 154 and linkage 155. While camera 102 is stationary for televising a slide, lamp 137 is off and solenoid 154 moves screen 138 into the horizontal position 138' (shown by broken lines in the drawing) outside the viewing field of lens 136.

With this arrangement it is immaterial if camera 102 momentarily moves into alinement with the slide being televised by camera 103, since the slide will continue to be uniformly illuminated. A similar arrangement is provided within mask 135 so that movement of camera 103 cannot interrupt the televising of a slide by camera 102.

Despite the use of large area diffuse light sources, it has been found that the horizontal lead screws and the electrical cables to the cameras may cast undesirable shadows on the array of slides. This can be prevented by the following means: A shallow trough 156 (made from sheet metal, for example) extends horizontally between brackets 106 and 107 and moves up and down with the brackets and lead screws whenever camera 102 is moved vertically relative to the array of slides. Lead screws 104 and 105 lie within trough 156 and thus are hidden from the optical system. The electrical cable (or cables) 157 to camera 102 lies within trough 156. The top of the trough is open, and studs 158 and 159 extend downwardly into the trough from the bottom of the camera case for supporting camera 102. Studs 158 and 159 have threaded holes that engage lead screws 104 and 105 so that camera 102 is moved horizontally by rotation of the lead screws.

The front portion of trough 156 (nearest the array of slides) is enclosed by a cover 160 and a ground glass diffusing screen 161. Within the enclosed portion there is a bank of lamps 162, which may be either a row of incandescent lamps or a string of fluorescent lamps. Lamps 162 produce light that passes through diffusing screen 161 and eliminates the shadow cast by trough 156, so that the array of slides is uniformly illuminated irrespective of the vertical position of the trough relative to the slide magazine.

A similar trough 163 extends between brackets 117 and 118 for enclosing lead screws 115 and 116 and the electrical cable (or cables) to camera 103. A covered portion 164 of trough 163 contains lamps for eliminating the shadow cast by trough 163.

Slide positions 00 and 09 are reserved for the televising of motion pictures. Consequently, photographic slides are not mounted in positions 00 and 09. Instead, motion pictures are projected into these positions from both sides of the array simultaneously. Preferably, lenses are placed in these two slide positions for minimizing the transmission of stray light into the camera and for focusing purposes.

Motion pictures are projected into position 00 by a system of mirrors and a motion picture projector 139. Light from projector 139 is partially reflected and partially transmitted without reflection by a semi-reflecting mirror 140. Preferably, mirror 140 is designed to reflect and to transmit about equal portions of the incident light. The art of making semi-reflecting mirrors is well known. The light reflected by mirror 140 is successively reflected by first-surface mirrors 141 and 142 to form motion picture images at position 00 in the plane of the array of slides. Light transmitted through semi-reflecting mirror 140 without reflection is successively reflected by first-surface mirrors 143, 144 and 145 to form motion picture images at position 00 in the plane of the array of slides. The two optical paths from projector 139 to position 00 are of equal lengths, so that the two sets of images projected into position 00 are both in focus simultaneously. The projected images may be televised by moving either of the two cameras 102 or 103 into optical alinement with the slide position 00.

Assume that television camera 102 is moved into alinement with the 00 position. Camera 102 blocks the optical path between mirror 142 and position 00, but motion picture images are still projected into position 00 through the optical path comprising mirrors 143, 144 and 145. Consequently, the projected motion picture images can be televised by camera 102.

Now assume that camera 102 is moved out of alinement with the 00 position and that camera 103 is moved into alinement with the 00 position. Camera 103 blocks the optical path between mirror 145 and the 00 position. However, motion picture images are still projected into the 00 position through the optical path comprising mirrors 140, 141 and 142. Thus the projected motion picture images may be televised by camera 103.

A similar arrangement is provided for projecting motion picture images into the 09 position. A motion picture projector 146 projects motion picture images through a mirror system into picture 09 from both sides of the slide magazine. Light from projector 146 is partially reflected and partially transmitted without reflection by a semi-reflecting mirror 147. The light reflected by mirror 147 is successively reflected by first-surface mirrors 148 and 149 to project motion picture images at position 09 in the plane of the array of slides. Light that passes through mirror 147 without reflection is successively reflected by first-surface mirrors 150, 151 and 152 to form motion picture images at position 09 in the plane of the array of slides. The motion picture images projected into position 09 may be televised by moving either of the cameras 102 and 103 into alinement with position 09.

As hereinbefore explained, the two cameras 102 and 103 "see" opposite sides of the still-picture slides mounted in the slide magazine, and therefore one of the cameras must have its horizontal scanning direction reversed relative to that of the other camera, so that both cameras will transmit television pictures that are properly oriented. With the optical system shown this is not true of the motion picture images projected into positions 00 and 09, since both cameras will "see" similarly oriented images. Consequently, means should be provided for changing the scanning direction of one of the cameras whenever it is moved into alinement with either of the positions 00 and 09 so that the scanning directions of the two cameras will be the same when the cameras are televising the motion pictures. Alternatively, an image-reversing prism or the like can be inserted in one of the two optical paths from each projector so that the images "seen" by the two television cameras when they are in the motion-picture positions will have the same orientation as the images seen by the same camera in the still-picture positions.

By projecting the motion pictures into the 00 and 09 positions from both sides of the array simultaneously, either of the two cameras 102 and 103 can be used for televising either of the two motion pictures that are projected. For example, either of the two cameras may be alined with the 00 position, while the other of the two cameras is alined with the 09 position, and by connecting the two cameras selectively to the television transmitter, either of the two motion pictures can be televised, selectively, and a change-over from one projector to the other can be made without interruption. Furthermore, one camera may be alined with either of the motion picture positions 00 and 09, while the other camera is alined with any of the 98 still-picture positions, so that a change-over from motion pictures to a still picture, and vice versa, can readily be made at any time without interruption of the television broadcast.

The lenses or lens systems that are preferably installed in positions 00 and 09 (called relay or field lenses), in addition to their obvious focusing functions, help to exclude stray light by directing to the camera lenses only that light which originates from one of the two projectors 139 and 146. For a further reduction of stray light, either or both of the two banks of lamps 124 through 127 and 129 through 132 may be turned off during the televising of motion pictures. For excluding outside light from the system, so that the slide projector can be operated in an illuminated room, the entire optical system preferably is enclosed within a light-tight box or case 153.

More than two motion picture projectors may be provided, if desired. For example, two additional motion picture projectors may be arranged to project motion pictures into the 90 and 99 slide positions, respectively. Associated with each of the additional projectors may be an optical system similar to the sets of mirrors associated with each of the projectors 139 and 146, so that either camera can televise images projected by each of the projectors, selectively. Thus, in its broader aspects the invention is not limited to any particular number of motion picture projectors.

In an alternative arrangement, the light sources and cameras are interchanged. A flying-spot scanner is substituted for each of the cameras 102 and 103. Phototubes or other photoelectric transducers are substituted for each of the lamps in the entire system, including the lamps within motion picture projectors 139 and 146. For color television, the phototubes are arranged in groups (usually groups of three) with different colored optical filters (usually red, blue and green) in front of respective phototubes in each group. The several phototubes are connected into circuits forming television camera means of the type heretofore used in the televising of visual material by the flying-spot scanning methods that are well known to those skilled in the art.

Figure 4:
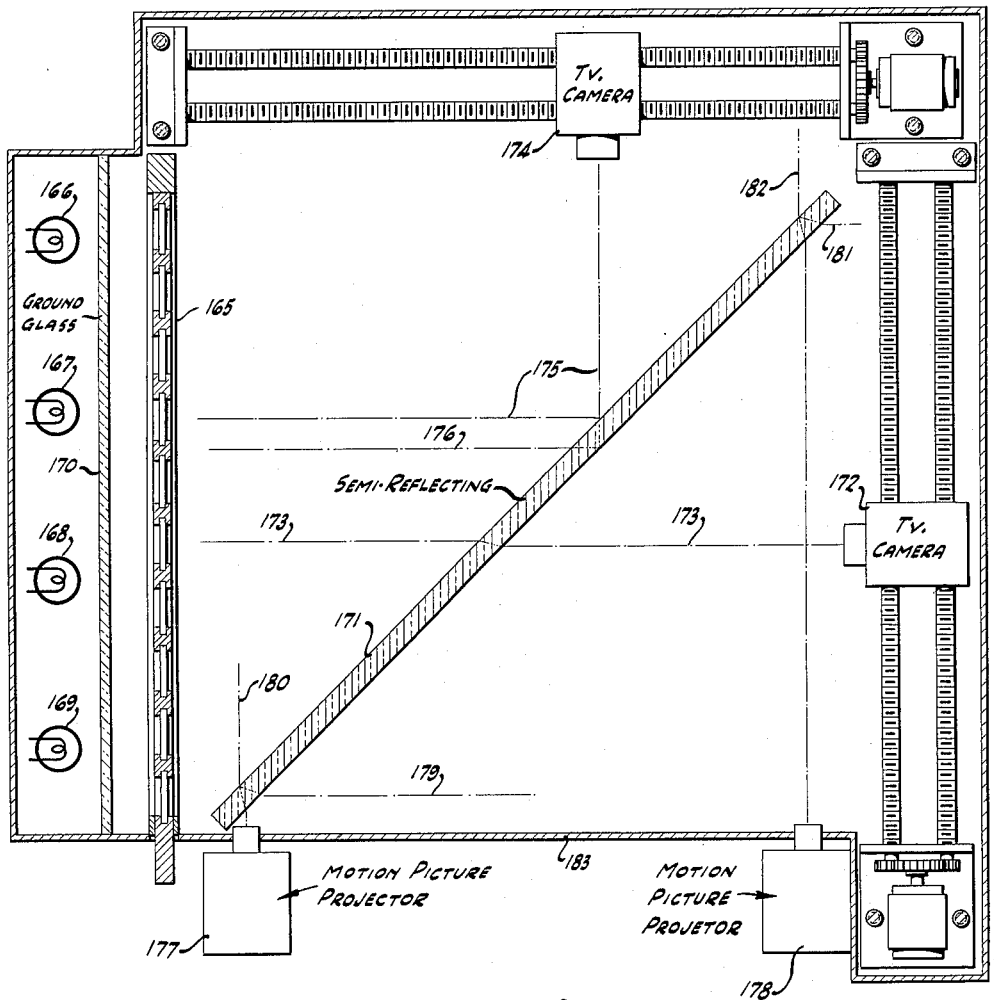
Fig. 4 is a somewhat schematic horizontal section of other apparatus embodying principles of this invention.

Reference is now made to Fig. 4 of the drawings, which illustrates another novel television slide projector. The slide magazine 165 is identical to the slide magazine 101 as shown in Fig. 1, and provides a coplanar array of 100 slide-mounting positions arranged in a matrix of ten rows and ten columns. Ninety-eight of the slide-mounting positions are adapted to receive ninety-eight conventional still-picture 2" x 2" transparencies, while two of the slide-mounting positions are left blank and reserved for motion picture projection. In the embodiment illustrated in Fig. 4, the array of slides is illuminated from only one side of the array. For this purpose there is provided a bank of lamps 166, 167, 168 and 169, and a ground glass diffusing screen 170. The bank of lamps may be either a planar array of incandescent lamps, or a planar array of fluorescent lamps, or any other suitable light sources. The light source uniformly illuminates the entire left side (as viewed in Fig. 4) of the array of slides.

A semi-reflecting first-surface mirror 171 (or a prism) is disposed on the opposite side of the slide magazine from the light source so that light passing through the transparencies mounted in slide magazine 165 is incident upon semi-reflecting mirror 171. Mirror 171 may be either a single large mirror or a coplanar array of smaller mirrors. For example, mirror 171 may be made up of ten horizontal strips, one strip of the mirror corresponding to each row of slides. Mirror 171 is disposed at an angle of approximately 45 degrees in the plane of the array of slides, and the mirror is made large enough so that its projection upon the plane of the array covers all of the 100 slide-mounting positions. The semi-reflecting mirror 171 is preferably designed so that approximately one-half of the incident light is reflected parallel to the array of slides (toward the top of Fig. 4) while approximately one-half of the incident light is transmitted through the mirror without reflection. Mirror 171 preferably is made by lightly silvering the front surface of a sheet of optical glass about one inch thick having flat parallel sides. Alternatively, in place of the semi-reflecting mirror, a semi-reflecting prism or prisms may be employed, with the cameras suitably positioned relative to the array of slides to maintain the optical alinement relations herein described.

A television camera 172 is disposed on the opposite side of semi-reflecting mirror 171 from slide magazine 165 so that light passing through a selected one of the still-picture slides and transmitted without reflection through mirror 171 enters the lens of camera 172. Suitable means are provided for moving camera 172 both vertically and horizontally relative to the slide magazine and in a plane parallel to the slide magazine so that camera 172 can be brought into optical alinement with any selected one of the slide-mounting positions. A lead screw arrangement such as that described in connection with Figs. 1 and 2 can be used to position camera 172. Thus camera 172 can view any selected one of the slides mounted in magazine 165 at any time, and can view each of the slides mounted in the magazine in any desired sequence. The optical path between a selected slide and camera 172 is generally indicated in the drawing by broken line 173.

Another television camera 174 is mounted to one side of slide magazine 165 and on the same side of semi-reflecting mirror 171 as the slide magazine so that light passing through a selected still-picture slide and reflected by mirror 171 reaches the lens of camera 174. A typical optical path between a selected slide and camera 174 is indicated in the drawings by the broken line 175. Camera 174 is movable both vertically and horizontally relative to slide magazine 165 and in a plane substantially perpendicular to the plane of the array of slides, so that the lens of camera 174 can be brought into optical alinement with any selected one of the 100 slide-mounting positions. A system of lead screws similar to those hereinbefore described can be used for positioning camera 174. Thus, camera 174 can view any selected one of the still-picture slides mounted in magazine 165 at any time, and can view all of the slides mounted in the magazine in any desired sequence.

Each camera has independent access to each slide mounted in the magazine. The apparatus illustrated in Fig. 4 can be operated in substantially the same manner as the apparatus illustrated in Figs. 1 through 3. While one of the two cameras is televising any selected slide, the other camera can be moved into alinement with any other selected slide. By connecting the television broadcasting equipment to each of the two cameras alternately, any number of slides can be televised in any desired sequence without interrupting the broadcast. Cameras 172 and 174 can be either monochrome or color television cameras, as desired.

In the embodiment illustrated in Fig. 4, neither camera can cast shadows which would interfere with the other camera. In fact, both cameras can view the same slide at the same time, if this should ever be desirable. Nor is there any difficulty due to shadows cast by the lead screws and electrical cables. Consequently, the shadow-elimination means discussed in connection with Figs. 1 through 3 are unnecessary in the embodiment illustrated in Fig. 4.

On the other hand, the optical efficiency of the system illustrated in Fig. 4 is lower than that of the system illustrated in Figs. 1 through 3, because less than half of the light passing through any selected slide is transmitted by mirror 171 to the lens of the selected camera. Furthermore the greater distance between the slide array and the cameras requires the use of a larger camera lens to produce an image of the same size and intensity on the photosensitive surface of the camera. In most cases a lower optical efficiency can be compensated for quite easily and economically simply by using brighter light sources. In both systems, the distance from each camera lens to any selected slide is constant, and no refocusing of the camera is required when the cameras are moved from one slide-viewing position to another.

Another factor that must be considered in the embodiment illustrated in Fig. 4 is the possibility of producing ghost or double images due to reflections from the back surface of the glass plate in mirror 171. Preferably, the front surface of the mirror is lightly silvered to form the semi-reflecting surface. The back surface of the mirror may be fluoride coated to minimize reflections in a manner well known to those skilled in the art. However, some reflection of light may occur from the unsilvered back surface of the glass plate, and this could produce a second image (at camera 174 in particular) slightly displaced from the desired image. To avoid this, the thickness of the glass plate is made such that the lens of camera 174 is optically alined with the blank spaces between slides in magazine 165 with respect to reflections from the back surface of the glass plate while the same camera lens is optically alined with a slide with respect to reflections from the front surface of the glass plate.

This is illustrated in the drawing by broken lines 175 and 176. For conventional 2" x 2" slides mounted fairly close together, this requirement is met by making the glass plate of mirror 171 approximately one inch thick.

Any two of the 100 slide-mounting positions of magazine 165 can be reserved for motion picture projection. These two positions are filled with an opaque member so that no light passes therethrough. Two motion picture projectors 177 and 178 are mounted along the opposite side of the projection system from camera 174. Light from projector 177 is partially reflected and partially transmitted without reflection by semi-reflecting mirror 171, as is indicated in the drawing by broken lines 179 and 180. The light reflected along the path 179 travels toward the position of camera 172 that would receive light from one of the two slide-mounting positions that are reserved for motion picture projection. Light traveling along path 180 travels toward the position of camera 174 corresponding to the same slide-mounting position.

Similarly, light from projector 178 is partly reflected and partly transmitted without reflection by the semi-reflecting mirror 171, as is indicated by broken lines 181 and 182. The light reflected along path 181 travels toward the position of camera 172 that would receive light from the other of the two slide-mounting positions reserved for motion picture projection, and the light transmitted along path 182 travels toward the position of camera 174 that corresponds to the same slide-mounting position. Thus each camera can be moved into position for viewing the images projected by either of the two motion picture projectors, selectively. Additional motion picture projectors in optical alinement with other slide-mounting positions may be provided, if desired.

For excluding external light, the entire projection system preferably is enclosed in a light-tight box or case 183.

It should be understood that this invention in its broader aspects is not limited to specific embodiments herein illustrated and described, and that the following claims are intended to cover all changes and modifications that do not depart from the true spirit and scope of the invention.

What is claimed is:

1. A television slide projector comprising means for supporting a plurality of partly transparent slides in a coplanar array, said array consisting of a plurality of coplanar rows each containing a plurality of coplanar slide-mounting positions, means for illuminating said array, a pair of television cameras directed toward said array and adapted for alternate transmission, means mounting said cameras in separate planes for individual movement into focus upon each of said slide-mounting positions for scanning the position to transmit a representation of slides therein whereby each of the cameras is adapted to transmit representations of slides in each of said slide-mounting positions, and means providing full illumination of the slide position in focus with the transmitting camera regardless of position or traverse of the other camera.

2. A television slide projector comprising means for supporting a plurality of partly transparent photographic slides in a coplanar array having two opposite planar sides, means for illuminating both sides of said array, two television cameras disposed on opposite sides of said array, and means for moving each of said cameras independently relative to said array for bringing each camera into alinement with each of a plurality of said slides selectively.

3. A television slide projector comprising means for supporting a plurality of partly transparent slides in a coplanar array having two opposite planar sides, said array consisting of a plurality of coplanar rows each containing a plurality of coplanar slide-mounting positions, means for illuminating substantially all of both sides of said array simultaneously, two television cameras disposed on opposite sides of said array, each of said cameras being focused on an area of said array adapted to be occupied by one slide, and means for moving each of said cameras independently into optical alinement with each of said slide-mounting positions selectively.

4. A television slide projector comprising means for supporting a plurality of partly transparent photographic slides in a coplanar array having two opposite planar sides, two light sources disposed on opposite sides of said array for illuminating respective sides of said array, two television cameras disposed on opposite sides of said array between said array and respective ones of said light sources, each of said cameras being movable relative to said array and being adapted to televise each slide mounted in said array, one slide at a time, selectively, two hoods attached to respective ones of said cameras, each of said hoods having an end adjacent to said array and containing an aperture substantially equal to the area occupied by one slide in the array.

5. A television slide projector comprising means for supporting a plurality of partly transparent photographic slides in a coplanar array having two opposite planar sides, two light sources disposed on opposite sides of said array for illuminating respective sides of said array simultaneously, two television cameras disposed on opposite sides of said array between said array and respective ones of said light sources, each of said cameras being movable relative to said array and being adapted to televise each slide mounted in said array, one slide at a time, selectively, two hoods attached to respective ones of said cameras and movable therewith relative to said array, each of said hoods having an end adjacent to said array, two lamps disposed within respective ones of said hoods and moving therewith relative to said array, each of said lamps being normally unlit and being lit during its motion relative to said array.

6. A television slide projector comprising a plurality of slide-mounting strips each adapted to support a plurality of transparencies in a coplanar row, supporting means for supporting said strips in coplanar relation to form an array of coplanar transparencies arranged in a plurality of rows and a plurality of columns, each of said strips being independently removable from said supporting means, said array having two opposite planar sides, means for illuminating both sides of said array, and two television cameras disposed on opposite sides of said array, each of said cameras being independently movable relative to said array and being adapted to televise each transparency in said array selectively.

7. A television slide projector comprising means defining a planar image-projection area in a projection plane, means for projecting optical images into said area from opposite sides of said plane, two television cameras disposed on opposite sides of said plane, means supporting each of said cameras for independent motion into and out of optical alinement with said area selectively, whereby the projected images can be televised by either of said cameras selectively.

8. Apparatus for televising photographic material, comprising means for supporting a plurality of photographic transparencies disposed in a common plane, means defining two image-projection areas disposed in said plane, means for illuminating both sides of said transparencies, two television cameras disposed on opposite sides of said plane, means for moving each of said cameras independently into optical alinement with each of said transparencies and each of said projection areas selectively, two motion picture projectors, optical means for projecting optical images from one of said motion picture projectors into one of said projection areas from both sides thereof, and optical means for projecting optical images from the other of said motion picture projectors into the other of said projection areas from both sides thereof, whereby each of said cameras can televise each of said transparencies and images projected by each of said projectors, selectively.

9. A television slide projector comprising means for supporting a plurality of partly transparent photographic slides in a coplanar array having two opposite planar sides, means for illuminating one side of said array, a semi-reflecting optical element disposed on the other side of said array at an angle to the plane of said array, said element partly reflecting and partly transmitting without reflection light passing through each slide of said array, a first television camera disposed on the opposite side of said element from said array for receiving light transmitted through said element without reflection, means for moving said first camera in a plane disposed so that said first camera can be brought into optical alinement with each slide in said array, one slide at a time, selectively, a second television camera disposed on the same side of said element as said array for receiving light reflected by said element, and means for moving said second camera in a plane disposed so that said second camera can be brought into optical alinement with each slide in said array, one slide at a time, selectively, each of said two cameras being movable independently of the other so that each camera can view said slides sequentially in any order.

10. A television slide projector as defined in claim 9, wherein said semi-reflecting element comprises a glass plate having two parallel flat surfaces and a semi-reflecting coating upon one of said surfaces, the thickness of said plate being such that said second camera is in optical alinement with a space between said slides with respect to reflections from one of said surfaces while the same camera is in optical alinement with a slide with respect to reflections from the other of said surfaces.

11. A television slide projector as defined in claim 9, wherein said semi-reflecting element is disposed at an angle of substantially forty-five degrees to the plane of said array and said second camera moves in a plane disposed substantially perpendicular to the plane of said array.

12. A television slide projector as defined in claim 9, additionally comprising two motion picture projectors disposed along the opposite side of the projector from said second camera so that light from said projectors is partly reflected by said semi-reflecting element toward the plane in which said first camera moves and is partly transmitted without reflection by said element toward the plane in which said second camera moves.

13. Apparatus for continuously televising a succession of separate images of photographic material comprising means defining a planar array of a large multiplicity of image-holders adapted to display both still and moving pictures, a pair of television cameras directed at said array, means illuminating said array, and means mounting said cameras in separate planes of camera movement with said planes being in spaced relation to said array with no part of either plane between the other plane and the array, means individually moving said cameras in the respective planes thereof into alinement in focus upon each individual image of said array in controlled succession, whereby the movement of either camera during operation of the other produces no interference with such operation.

14. Apparatus as defined in claim 13 further characterized by light means mounted upon each of said cameras for providing insuring full illumination of the individual image of said array in focus with either of said cameras.

References Cited in the file of this patent

UNITED STATES PATENTS

| | | |
|---|---|---|
| 2,193,869 | Goldsmith | Mar. 19, 1940 |
| 2,301,375 | Cox | Nov. 10, 1942 |
| 2,314,920 | Bumstead | Mar. 30, 1943 |
| 2,344,662 | Warner | Mar. 21, 1944 |
| 2,415,450 | Swann | Feb. 11, 1947 |
| 2,435,840 | Morton | Feb. 10, 1948 |
| 2,624,798 | Dinga | Jan. 6, 1953 |
| 2,707,666 | Becker | May 3, 1955 |
| 2,750,444 | Owens | June 12, 1956 |
| 2,753,395 | Lawrence | July 3, 1956 |
| 2,764,697 | Duke | Sept. 25, 1956 |